United States Patent [19]

Eberly, Jr.

[11] Patent Number: 4,498,979

[45] Date of Patent: Feb. 12, 1985

[54] HYDRODESULFURIZATION PROCESS WITH CONVERSION OF HEAVY HYDROCARBONS UTILIZING A CATALYST CONTAINING A GROUP IIA METAL COMPONENT

[75] Inventor: Paul E. Eberly, Jr., Baton Rouge, La.

[73] Assignee: Exxon Research & Engineering Co., Florham Park, N.J.

[21] Appl. No.: 530,906

[22] Filed: Sep. 12, 1983

[51] Int. Cl.³ .............................................. C10G 45/04
[52] U.S. Cl. ................................................ 208/216 R
[58] Field of Search ......................................... 208/216

[56] References Cited

U.S. PATENT DOCUMENTS

| | | | |
|---|---|---|---|
| Re. 29,214 | 7/1977 | Carlson | 208/216 R |
| 2,620,362 | 12/1952 | Stiles | 208/216 R |
| 2,640,009 | 5/1953 | Montgomery | 208/216 |
| 2,853,429 | 9/1958 | Gilson et al. | 208/216 |
| 3,112,257 | 11/1963 | Dourves | 208/216 |
| 3,125,507 | 3/1964 | Tupman et al. | 208/216 R |
| 3,125,508 | 3/1964 | Adhnyton et al. | 208/216 R |
| 3,694,350 | 9/1972 | Wennerberg | 208/216 R |
| 3,705,097 | 12/1972 | Head | 208/217 |
| 3,846,286 | 11/1974 | Phillipson | 208/216 R |
| 3,846,287 | 11/1974 | Jaffe et al. | 208/216 R |
| 3,976,561 | 8/1976 | Eyles | 208/216 R |
| 4,061,563 | 12/1977 | Hilfman | |
| 4,098,683 | 7/1978 | Conway | 208/216 |
| 4,113,656 | 9/1978 | Riley et al. | 502/220 |
| 4,132,632 | 1/1979 | Yu et al. | |
| 4,140,626 | 2/1979 | Bertolacini et al. | 208/216 R |
| 4,202,758 | 5/1980 | O'Hara et al. | 208/216 R |
| 4,203,829 | 5/1980 | Bertolacini | |

FOREIGN PATENT DOCUMENTS

| | | | |
|---|---|---|---|
| 564469 | 10/1958 | Canada | 208/216 R |
| 627160 | 9/1961 | Canada | 208/216 R |

Primary Examiner—Delbert E. Gantz
Assistant Examiner—Helane E. Maull
Attorney, Agent, or Firm—Marthe L. Gibbons

[57] ABSTRACT

A hydrodesulfurization process is provided in which a heavy hydrocarbonaceous feed comprising materials boiling above 1020° F. is desulfurized at conditions to convert at least a portion of the 1020° F.+ materials, in the presence of hydrogen and a non-zeolitic hydrodesulfurization catalyst comprising a Group IIA metal component such as magnesia.

9 Claims, 1 Drawing Figure

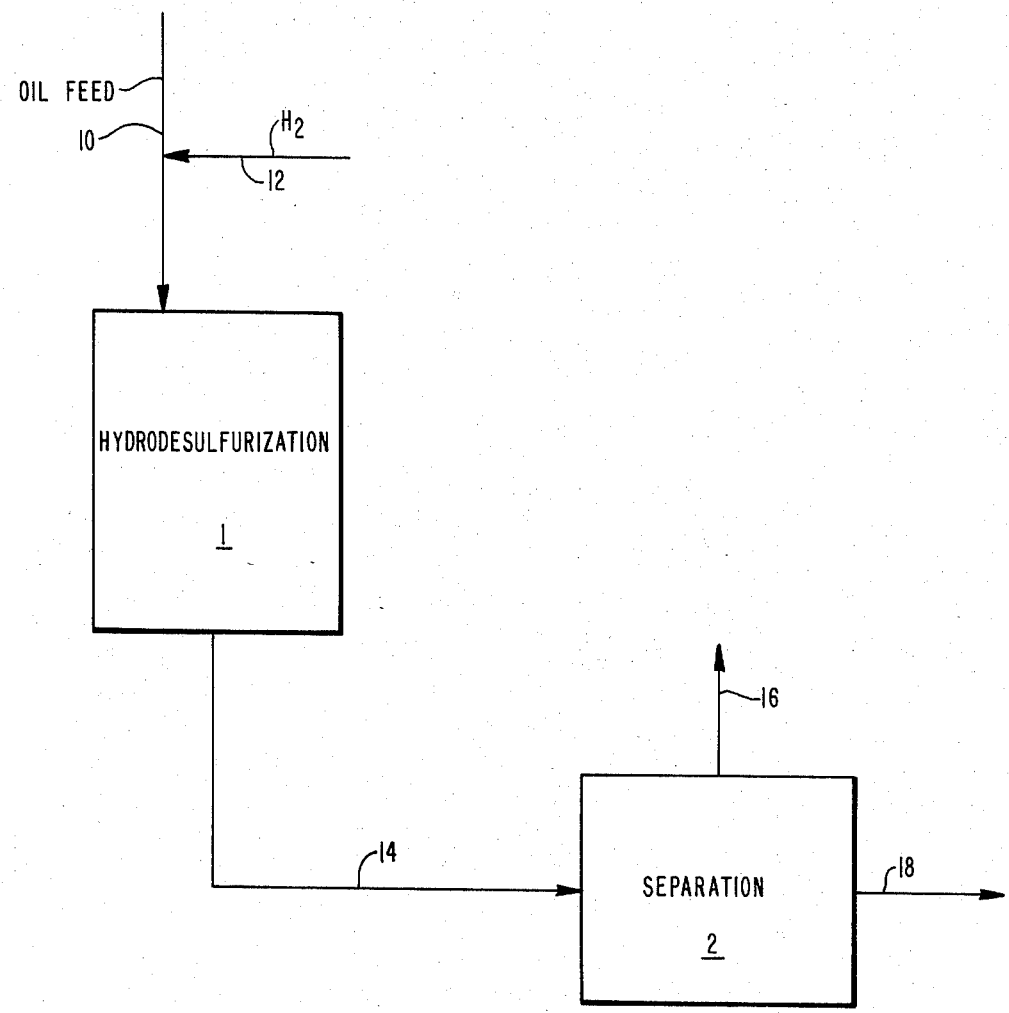

HYDRODESULFURIZATION PROCESS WITH CONVERSION OF HEAVY HYDROCARBONS UTILIZING A CATALYST CONTAINING A GROUP IIA METAL COMPONENT

BACKGROUND OF THE INVENTION

1. Field of the Invention

The present invention relates to a process for the hydrodesulfurization of a hydrocarbonaceous oil at conditions to effect conversion of the heavy constituents of the oil to lower boiling hydrocarbons utilizing a catalyst containing a Group IIA metal component such as magnesium.

2. Description of the Prior Art

U.S. Pat. No. 4,098,683 discloses a hydrodesulfurization process utilizing Co-Mo or Ni-Mo on alumina and treating a residual oil at 600° to 800° F. Alkaline earth metals such as magnesium can be added in an amount of 1 to 5 percent to the catalyst.

U.S. Pat. No. 4,061,563 discloses a nickel-tungsten on silica-alumina catalyst for hydroprocessing hydrocarbons. A nickel-molybdenum catalyst is disclosed as conventional for hydrocracking accompanied by hydrodesulfurization. The addition of an alkaline earth metal to a hydroprocessing catalyst is also disclosed.

U.S. Pat. No. 4,203,829 discloses a hydrodesulfurization catalyst comprising cobalt, molybdenum, alumina and magnesia. The compositions of the catalyst are shown in Table I, column 5. Magnesium oxide comprises a major portion of the catalyst.

U.S. Pat. No. 4,140,626 and U.S. Pat. No. 4,132,632 disclose desulfurization catalysts comprising cobalt, molybdenum and a magnesium oxide-alumina support comprising more than 70 percent magnesium oxide.

A problem that is encountered when heavy oils having constituents boiling above 1020° F. are hydrode-sulfurized at severe conditions (e.g., higher temperatures where cracking of some of the 1020° F.+ materials occurs) is formation of insoluble precipitates that cause plugging of the reactor or of the downstream equipment, that is, deposition of sediment. Plugged reactors usually means premature closing of the reactors for catalyst replacement.

It has now been found that sulfur-containing heavy oils can be desulfurized while simultaneously converting at least a portion of the 1020° F.+ materials and minimizing the formation of insoluble precipitates in process by utilizing a catalyst having a specified amount of a group IIA metal component.

SUMMARY OF THE INVENTION

In accordance with the invention, there is provided a hydrodesulfurization process which comprises contacting a sulfur-containing heavy hydrocarbonaceous feed comprising materials boiling above 1020° F. with a non-zeolitic catalyst comprising a hydrogenation component, a Group IIA metal component of the Periodic Table of Elements, an alumina support, the molar ratio of said Group IIA metal component, calculated as metal oxide, to said alumina ranging from 0.012:1 to 0.13:1, in the presence of added hydrogen, in the hydrodesulfurization zone, under conditions to at least partially desulfurize said feed and to convert at least a portion of said 1020° F. materials to lower boiling products.

BRIEF DESCRIPTION OF THE DRAWING

The FIGURE is a schematic flow plan of one embodiment of the invention.

DESCRIPTION OF THE PREFERRED EMBODIMENT

Referring to the FIGURE, a heavy hydrocarbonaceous oil feed comprising materials boiling above 1050° F. is passed by line 10 in admixture with a hydrogen-containing gas (line 12) into hydrodesulfurization zone 1. All boiling points referred to herein are atmospheric pressure boiling points unless otherwise specified.

THE HEAVY HYDROCARBON OIL FEED

Suitable heavy hydrocarbonaceous oil feeds for the hydrodesulfurization zone of the present invention include hydrocarbonaceous oils comprising materials boiling above. 1020° F., preferably comprising at least 10 volume percent materials boiling above 1050° F., more preferably comprising at least 25 volume percent materials boiling above 1050° F. The initial boiling point of such oils may range from about 550° F. to about 1050° F., although whole crude oils may be used. Suitable oil feeds include heavy crude mineral oils; residual petroleum fractions, such as atmospheric residua and vacuum residua. Such oils usually contain large amounts of sulfur and may contain metallic contaminants such as nickel and vanadium. The total metal content of such oils may range up to 2000 weight parts per million or more, and the sulfur content may range from at least 0.5 weight percent to 8 weight percent or more. The Conradson carbon residue of the oils will generally be above 2 weight percent, preferably from about 5 to about 50 weight percent, and more preferably above 7 weight percent (as to Conradson carbon, see ASTM test D 189-65). The heavy hydrocarbon oil may be derived from any source such as petroleum, shale oil, tar sand oil, heavy oils produced by coal liquefaction processes, etc. and mixtures thereof. The preferred oil feeds are petroleum residua such as atmospheric residua and vacuum residua.

THE HYDRODESULFURIZATION CATALYST

The hydrodesulfurization catalyst may be disposed in a fixed bed, moving bed, ebullated bed or fluidized bed. Preferably, the catalyst is disposed in a fixed bed in hydrodesulfurization zone 1. The hydrodesulfurization catalysts suitable for use in the process of the present invention are non-zeolitic catalysts comprising a hydrogenation component, a Group IIA metal component of the Periodic Table of Elements and an alumina support. The Periodic Table of Elements referred to herein is in accordance with the *Handbook of Chemistry and Physics*, published by the Chemical Rubber Co., Cleveland, Ohio, 45 edition, 1964. The catalysts for use in the present invention comprise less than 6 weight percent silica, based on the weight of the alumina support. Preferably, the catalysts are substantially silica-free. By "substantially silica-free" is intended herein that the catalyst comprise less than 0.5 weight percent silica, based on the total catalyst. The Group IIA metal component may be beryllium, magnesium, calcium, strontium, barium, and mixtures fhereof. The Group IIA metal may be present as elemental metal, metal oxide or metal sulfide. Preferably, the Group IIA metal component is a magnesium component such as magnesium oxide (i.e., magnesia) or magnesium sulfide. The Group IIA component is present in the catalyst in an amount such that the molar ratio of Group IIA metal component, calculated as the metal oxide, to alumina ranges from 0.012:1 to 0.13:1, preferably from 0.04:1 to 0.13:1. The hydrogenation component of the catalyst is selected from the group consisting of a group VIB metal component, a group VIII metal component and mixtures thereof. Preferably, the hydrogenation component comprises at least one group VIB metal component and at least one group VIII metal component. The preferred Group VIB metal component is selected from the group consisting of molybdenum oxide, molybdenum sulfide, tungsten oxide, tungsten sulfide and mixtures thereof. The preferred Group VIII metal component is selected from the group consisting of nickel oxide, nickel sulfide, cobalt oxide, cobalt sulfide and mixtures thereof. The oxide catalysts are preferably sulfided prior to use in a conventional way. Suitable catalyst compositions are shown in Table I.

TABLE I

| Catalyst Composition | Broad Range | Preferred Range |
|---|---|---|
| Nickel or cobalt as oxide, weight percent | 1–10 | 2–6 |
| Tungsten or molybdenum as oxide, weight percent | 5–35 | 10–30 |
| Group IIA metal as oxide, weight percent | 0.16–16 | 0.6–15 |
| Alumina | balance | balance |
| Group IIA oxide/ $Al_2O_3$, molar ratio | 0.012:1 to 0.13:1 | 0.04:1 to 0.13:1 |

The preferred hydrodesulfurization catalysts are catalysts such as those described in U.S. Pat. No. 4,113,656 having a median pore radius ranging from 70 to 95 Angstroms, to which a Group IIA metal component such as magnesium, has been added in the required ratio.

The catalyst may be prepared in a conventional manner, for example, by impregnating an alumina support with a salt of the desired hydrogenation metals. The Group IIA metal component may be incorporated in the catalyst at any stage in the catalyst preparation. Thus, it can be incorporated into the alumina support during the gellation stage by adding a soluble group IIA salt such as a sulfate, nitrate, carbonate, acetate and the like to the acidic precipitating agent such as sulfuric acid, or aluminum sulfate solution. Alternatively, the group IIA metal component can be impregnated on the alumina support during any one or more impregnation steps such as utilized when impregnating the nickel, cobalt, molybdenum or tungsten components. Furthermore, the group IIA metal component can be impregnated on a finished catalyst containing all the components except the group IIA metal component. Preferably, the group IIA metal component is impregnated on a finished catalyst.

Suitable operating conditions for the hydrodesulfurization zone are summarized in Table II.

HYDRODESULFURIZATION OPERATING CONDITIONS

TABLE II

| Conditions | Broad Range | Preferred Range |
|---|---|---|
| Temperature, °F. | 550–900 | 700–830 |
| Total Pressure, psig | 300–3,000 | 800–2,500 |
| Liquid Hourly Space Velocity (V/V/Hr) | 0.02–3.0 | 0.15–0.5 |

TABLE II-continued

| Conditions | Broad Range | Preferred Range |
|---|---|---|
| Hydrogen Rate, SCF/BBL | 1,000–10,000 | 2,000–7,000 |

The hydrogen-containing gas introduced by line 12 into hydrodesulfurization zone 1 may be pure hydrogen but will generally be an impure hydrogen such as a hydrogen-containing gas derived from a process such as reformer off-gas. Hydrodesulfurization zone 1 is operated at conditions to desulfurize the oil at least partially and to convert at least a portion of the 1020° F.+ materials to lower boiling products, preferably to convert at least 10 weight percent of the 1020° F.+ materials more preferably to convert at least 20 weight percent of the 1020° F.+ materials. The hydrodesulfurization zone effluent, which comprises a normally gaseous phase and a normally liquid phase, including the hydrodesulfurized oil, is removed from hydrodesulfurization zone 1 by line 14 and may be passed to separation zone 2 to separate the gaseous phase and remove it by line 16 from the normally liquid phase which is removed by line 18. The normally liquid phase, which comprises a hydrodesulfurized oil, may be separated into fractions by conventional means such as distillation.

The following example is presented to illustrate the invention.

EXAMPLE

Hydrodesulfurization experiments were performed utilizing the catalysts having the compositions shown in Table III.

TABLE III

| Constituents | Catalyst A | Catalyst B | Catalyst C |
|---|---|---|---|
| MgO, weight percent | 0 | 2.0 | 5.0 |
| NiO, weight percent | 5.2 | 5.1 | 4.9 |
| $MoO_3$, weight percent | 14.8 | 14.5 | 14.1 |
| $Al_2O_3$, weight percent | 80.0 | 78.4 | 76.0 |
| $MgO/Al_2O_3$, weight ratio | 0 | 0.026 | 0.065 |

Catalyst B was a catalyst in accordance with the present invention. Catalysts A and C were comparative catalysts since catalyst A had zero magnesium and catalyst C had a molar ratio of magnesia to alumina which was greater than the ratio of the catalysts of the present invention.

Catalysts A, B and C were each used in hydrodesulfurization runs utilizing a hydrocarbonaceous feed having the properties shown in Table IV.

TABLE IV

| Properties of Heavy Arabian Atmospheric Residuum | |
|---|---|
| Specific Gravity | 0.9881 |
| wt. % | |
| sulfur | 4.14 |
| nitrogen | 0.252 |
| carbon | 84.46 |
| hydrogen | 10.90 |
| asphaltenes (heptane insoluble) | 8.68 |
| Conradson carbon | 12.46 |
| wppm | |
| nickel | 28 |
| vanadium | 90 |
| vol. % 1020° F.+ | 46.0 |

TABLE IV-continued

Properties of Heavy Arabian Atmospheric Residuum

| wt. % 1020° F.+ | 48.5 |
|---|---|

These catalysts were tested side-by-side in fixed bed reactors at a space velocity of 0.3 V/H/V, a pressure of 2000 psig, a hydrogen rate of 4500 SCF/B, and a temperature of 775° F.

The results of these experiments after the same number of days of operation, that is, after 15 days, are sumarized in Table V.

TABLE V

Comparison of Catalysts

| Catalyst | A | B | C |
|---|---|---|---|
| MgO, wt. % | 0 | 2.0 | 5.0 |
| Removal, wt. % | | | |
| sulfur | 96 | 96 | 90 |
| Conradson carbon | 81 | 81 | 72 |
| nickel | 97 | 97 | 93 |
| 1020° F.+ | 74 | 75 | 71 |

At the same conditions, catalyst B, which is a catalyst in accordance with the present invention, was at least equivalent to catalyst A. However, catalyst C which contained a greater amount of MgO which was outside the stated molar ratio of the present invention, was inferior in removal of sulfur, Conradson carbon precursors, nickel and 1020° F.+ materials. In the experiments in which catalyst A and catalyst C were utilized, there was an excessive amount of insoluble deposits (i.e. sediments) in the reactors which plugged within 20 days of operation. The term "plugged" in these experiments, refers to a situation in which high pressure drops occur in the reactor and no feed can be pumped through the fixed bed reactor system. Thus, plugging of the reactor means termination of the run. The reactor containing catalyst B did not plug and the run was voluntarily terminated after 53 days of operation at 810° F. Under these conditions, the percent removal of the various constituents when the run was terminated are shown in Table VI.

TABLE VI

Heavy Arabian Atmospheric Residuum at 810° F., 0.3 V/H/V, 2000 psig, 4500 SCF/B Using Catalyst B for 53 days

| Constituents | Removal, wt. % |
|---|---|
| sulfur | 88 |
| nitrogen | 41 |
| Conradson carbon | 78 |
| 1020° F.+ | 91 |
| asphaltenes (heptane insoluble) | 93 |
| nickel | 100 |
| vanadium | 100 |

What is claimed is:

1. A hydrodesulfurization process which comprises: contacting a sulfur-containing heavy hydrocarbonaceous feed comprising materials boiling above 1020° F. with a non-zeolitic catalyst comprising a hydrogenation component, a magnesium component, and an alumina support, the molar ratio of said magnesium component, calculated as metal oxide, to said alumina ranging from 0.012:1 to 0.13:1, in the presence of added hydrogen, in a hydro-desulfurization zone, under conditions to at least partially desulfurize said feed and to convert at least a portion of said 1020° F. materials to lower boiling products.

2. The process of claim 1 wherein said molar ratio of magnesium component to alumina ranges from 0.04:1 to 0.13:1.

3. The process of claim 1 wherein said hydrogenation component comprises at least one Group VIB metal component and at least one Group VIII metal component.

4. The process of claim 1 wherein said Group VIB metal component is selected from the group consisting of molybdenum oxide, molybdenum sulfide, tungsten oxide, tungsten sulfide, and mixtures thereof and wherein said Group VIII metal component is selected from the group consisting of nickel oxide, nickel sulfide, cobalt oxide, cobalt sulfide and mixtures thereof.

5. The process of claim 1 wherein said catalyst comprises less than 6 weight percent silica based on the weight of said alumina support.

6. The process of claim 1 wherein said conditions in said hydrodesulfurization zone are such as to convert at least about 10 weight percent of said 1020° F.+ materials to lower boiling products.

7. The process of claim 1 wherein said conditions in said hydrodesulfurization zone include a temperature ranging from about 550° to about 900° F., and a total pressure ranging from about 300 to about 3000 psig.

8. The process of claim 1 wherein said conditions in said hydrodesulfurization zone include a temperature ranging from about 750° to about 830° F.

9. The process of claim 1 wherein said hydrocarbonaceous feed comprises at least 10 volume percent of materials boiling above 1020° F.

* * * * *